us012408071B2

(12) United States Patent
Hong

(10) Patent No.: US 12,408,071 B2
(45) Date of Patent: Sep. 2, 2025

(54) METHOD FOR TRANSMISSION PROCESSING AND COMMUNICATION DEVICE

(71) Applicant: BEIJING XIAOMI MOBILE SOFTWARE CO., LTD., Beijing (CN)

(72) Inventor: Wei Hong, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 414 days.

(21) Appl. No.: 17/919,205

(22) PCT Filed: Apr. 16, 2020

(86) PCT No.: PCT/CN2020/085213
§ 371 (c)(1),
(2) Date: Oct. 14, 2022

(87) PCT Pub. No.: WO2021/208046
PCT Pub. Date: Oct. 21, 2021

(65) Prior Publication Data
US 2023/0164621 A1    May 25, 2023

(51) Int. Cl.
*H04W 28/02* (2009.01)
*H04W 28/06* (2009.01)

(52) U.S. Cl.
CPC ....... *H04W 28/0278* (2013.01); *H04W 28/06* (2013.01)

(58) Field of Classification Search
None
See application file for complete search history.

(56) References Cited

U.S. PATENT DOCUMENTS

2003/0232624 A1   12/2003   Toskala
2004/0156314 A1   8/2004   Lund et al.
(Continued)

FOREIGN PATENT DOCUMENTS

CN   1663296 A   8/2005
CN   102056242 A   5/2011
(Continued)

OTHER PUBLICATIONS

The Second Office Action Issued in CN application No. 202080000741.3 dated May 5, 2023 with English translation, (10p).
(Continued)

*Primary Examiner* — Jeffrey M Rutkowski
*Assistant Examiner* — Justin Michael Whitaker
(74) *Attorney, Agent, or Firm* — Arch & Lake LLP

(57) ABSTRACT

The present disclosure provides a method for transmission processing and a communication device. The method includes acquiring configuration information of a buffer overflow report; and determining a strategy to solve buffer overflow in a UE based on the configuration information; where the step of determining the strategy to solve the buffer overflow in the UE based on the configuration information includes: in response to determining that the UE is allowed to report a buffer overflow problem based on the configuration information, reporting a reporting information of the buffer overflow in the UE; and in response to determining that the UE is not allowed to report a buffer overflow problem based on the configuration information and a buffer overflows, discarding a part of a data packet to be buffered based on a local processing strategy.

16 Claims, 4 Drawing Sheets

(56) References Cited

U.S. PATENT DOCUMENTS

| | | |
|---|---|---|
| 2005/0002366 A1 | 1/2005 | Toskala et al. |
| 2006/0062311 A1 | 3/2006 | Sun et al. |
| 2011/0310800 A1* | 12/2011 | Lin .................. H04W 28/0278 370/328 |
| 2014/0219236 A1 | 8/2014 | Uchino et al. |
| 2016/0007229 A1* | 1/2016 | Gao .................. H04W 28/0278 370/329 |
| 2016/0227574 A1* | 8/2016 | Raina .................... H04W 72/23 |
| 2019/0082393 A1 | 3/2019 | Burugupalli et al. |
| 2019/0297555 A1 | 9/2019 | Hampel et al. |
| 2019/0306745 A1 | 10/2019 | Kim |

FOREIGN PATENT DOCUMENTS

| | | |
|---|---|---|
| CN | 103781123 A | 5/2014 |
| CN | 104053076 A | 9/2014 |
| CN | 106888481 A | 6/2017 |
| CN | 107645778 A | 1/2018 |
| CN | 109565718 A | 4/2019 |

OTHER PUBLICATIONS

Song Li-hua et al., "Performance service based transport layer congestion control resolution for high-speed networks," Journal of PLA University of Science and Technology (Natural Science Edition), vol. 13 No. 3, Jun. 15, 2012 with English translation, (7p).

Omur Ozel et al., "Transmission with Energy Harvesting Nodes in Fading Wireless Channels: Optimal Policies," IEEE Journal on Selected Areas in Communications, vol. 29, No. 8, Sep. 2011, (12p).

The First CNOA issued in Application No. 202080000741.3, dated Oct. 10, 2022, with English translation, (22p).

International Search Report issued in Application No. PCT/CN2020/085213, dated Jan. 18, 2021 with English translation, (4p).

* cited by examiner

METHOD FOR TRANSMISSION PROCESSING AND COMMUNICATION DEVICE

CROSS-REFERENCE

The present application is the U.S. National Stage of International Application No. PCT/CN2020/085213, filed on Apr. 16, 2020, the entire content of which is incorporated herein by reference for all purposes.

TECHNICAL FIELD

The present disclosure relates to, but is not limited to, a field of wireless communication technology, and more particularly to a method and an apparatus for transmission processing, user equipment, a base station and a storage medium.

BACKGROUND

With continuous development of wireless communication technology, a transmission rate supported by User Equipment (UE) is getting higher and higher. A base station may configure a high-level Multiple-Input Multiple-Output (MIMO) mode, a multi-carrier aggregation mode, a high-level modulation coding mode, or a large bandwidth mode for the UE, so as to enable a terminal to obtain an ultra-high transmission rate, to meet user requirements for a high transmission rate.

SUMMARY

The present disclosure discloses a method for transmission processing and a communication device.

According to a first aspect of the present disclosure, a method for transmission processing is provided and includes:
  acquiring configuration information of a buffer overflow report; and
  determining a strategy to solve buffer overflow in a UE based on the configuration information.

According a second aspect of the present disclosure, a method for transmission processing is provided and includes:
  issuing configuration information of a buffer overflow report; and
  receiving reporting information indicating buffer overflow in a UE, where the reporting information is sent based on the configuration information.

According to a third aspect of the present disclosure, a communication device is provided and includes a processor and a memory for storing executable instructions by the processor.

Furthermore, the processor is configured to, when executing the executable instructions, implement the following operations:
  acquiring configuration information of a buffer overflow report; and
  determining a strategy to solve buffer overflow in a UE based on the configuration information.

DETAILED DESCRIPTION

Figure 1:
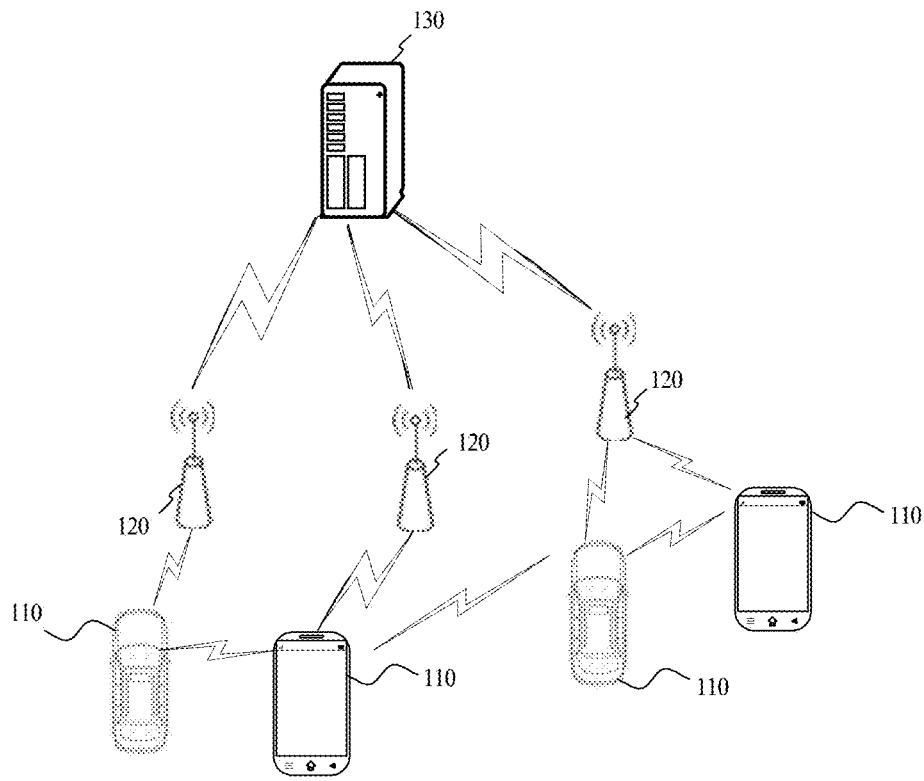
FIG. 1 is a structural diagram of a wireless communication system.

Examples will be described in detail herein, examples of which are illustrated in the drawings. When the following description refers to the drawings, the same numerals in different drawings indicate the same or similar elements unless otherwise indicated. Implementations described in following examples do not represent all implementations consistent with embodiments of the present disclosure. Rather, they are merely examples of apparatus and methods consistent with some aspects of embodiments of the present disclosure as recited in the appended claims.

Terms used in embodiments of the present disclosure are only for the purpose of describing particular embodiments, and are not intended to limit embodiments of the present disclosure. As used in embodiments of the present disclosure and the appended claims, singular forms "a," and "the" are intended to include plural forms as well, unless the context clearly dictates otherwise. It should also be understood that a term "and/or" as used herein refers to including any or all possible combinations of one or more associated items listed.

It should be understood that although terms first, second, third, etc., may be used in embodiments of the present disclosure to describe various information, such information should not be limited to these terms. These terms are only used to distinguish the same type of information from each other. For example, without departing from the scope of embodiments of the present disclosure, the first information may also be referred to as the second information, and similarly, the second information may also be referred to as the first information, depending on the context. For example, a word "if" used herein can be interpreted as "at the time when" or "when" or "in response to determining."

Reference throughout this specification to "one embodiment," "an embodiment," "an example," "some embodiments," "some examples," or similar language means that a particular feature, structure, or characteristic described is included in at least one embodiment or example. Features, structures, elements, or characteristics described in connection with one or some embodiments are also applicable to other embodiments, unless expressly specified otherwise.

The terms "module," "sub-module," "circuit," "sub-circuit," "circuitry," "sub-circuitry," "unit," or "sub-unit" may include memory (shared, dedicated, or group) that stores code or instructions that can be executed by one or more processors. A module may include one or more circuits with or without stored code or instructions. The module or circuit may include one or more components that are directly or indirectly connected. These components may or may not be physically attached to, or located adjacent to, one another.

Buffer configurations and read/write rates of some UEs may not support a high transmission rate, which may lead to the problem of buffer overflow of the user equipment and cause the data packet loss, thus further resulting in frequent retransmission of data, waste of system resources, and affecting transmission quality of service.

Referring to FIG. 1, FIG. 1 is a structural diagram of a wireless communication system according to an embodiment of the present disclosure. As illustrated in FIG. 1, a wireless communication system is a communication system based on cellular mobile communication technology, and the wireless communication system may include multiple user equipment 110 and multiple base stations 120.

The user equipment 110 may be a device that provides voice and/or data connectivity to a user. The user equipment 110 may communicate with one or more core networks via a radio access network (RAN). The user equipment 110 may be an Internet-of-Things user equipment, such as a sensor device, a mobile phone (or referred to as a "cellular" phone) and a computer having an Internet-of-Things user equipment. For example, the user equipment 110 may be a fixed apparatus, a portable apparatus, a pocket-sized apparatus, a handheld apparatus, a computer built-in apparatus or an in-vehicle apparatus. For example, the user equipment 110 may be a station (STA), a subscriber unit, a subscriber station, a mobile station, a mobile, a remote station, an access point, a remote user terminal, an access user terminal, a user terminal, a user agent, a user device or user equipment. Alternatively, the user equipment 110 may also be a device of an unmanned aerial vehicle. Alternatively, the user equipment 110 may be a vehicle-mounted device, for example, a trip computer having a wireless communication function, or a wireless communication device connected to the trip computer. Alternatively, the user equipment 110 may be a roadside device, such as a street lamp, a signal lamp, or other roadside device that has a wireless communication function.

The base station 120 may be a network side device in a wireless communication system. The wireless communication system may be the 4th generation mobile communication (4G) system, which is also known as a long term evolution (LTE) system. Alternatively, the wireless communication system may be a 5G system, which is also known as a new radio system (NR) or a 5G NR system. Alternatively, the wireless communication system may be a next generation system of a 5G system. The access network in the 5G system may be referred to as a NG-RAN (New Generation-Radio Access Network).

The base station 120 may be an evolved NodeB (eNB) used in a 4G system. Alternatively, the base station 120 may be a base station (gNB) adopting a centralized-distributed architecture in a 5G system. When the base station 120 adopts a centralized-distributed architecture, the base station 120 generally includes a central unit (CU) and at least two distributed units (DU). The central unit is provided with protocol stacks of a Packet Data Convergence Protocol (PDCP) layer, a Radio Link Control (RLC) Protocol layer and a Media Access Control (MAC) layer. The distributed unit is provided with a protocol stack of a Physical (PHY) layer. A specific implementation of the base station 120 is not limited in the embodiment of the present disclosure.

A wireless connection may be established between the base station 120 and the user equipment 110 via a wireless air interface. In various embodiments, the wireless air interface is based on the fourth generation mobile communication network technology (4G) standard. Alternatively, the wireless air interface is based on the fifth generation mobile communication network technology (5G) standard, for example, the wireless air interface is a new radio. Alternatively, the wireless air interface may be based on the next generation mobile communication network technology standard of 5G.

Alternatively, an E2E (End to End) or D2D (device to device) connection may also be established between the user equipment 110, for example, scenarios of V2V (vehicle to vehicle) communication, V2I (vehicle to Infrastructure) communication, and V2P (vehicle to pedestrian) communication in vehicle to everything (V2X).

Here, the above user equipment may be considered as terminal equipment in the following embodiments.

In some embodiments, the wireless communication system may further include a network management device 130.

Multiple base stations 120 are respectively connected to the network management device 130. The network management device 130 may be a core network device in a wireless communication system. For example, the network management device 130 may be a Mobility Management Entity (MME) in an Evolved Packet Core network (EPC). Alternatively, the network management device may be another core network device, such as a Serving GateWay (SGW), a Public Data Network GateWay (PGW), a Policy and Charging Rules Function (PCRF) or a Home Subscriber Server (HSS). Embodiments of the present disclosure are not limited to the implementation form of the network management device 130.

Figure 2:
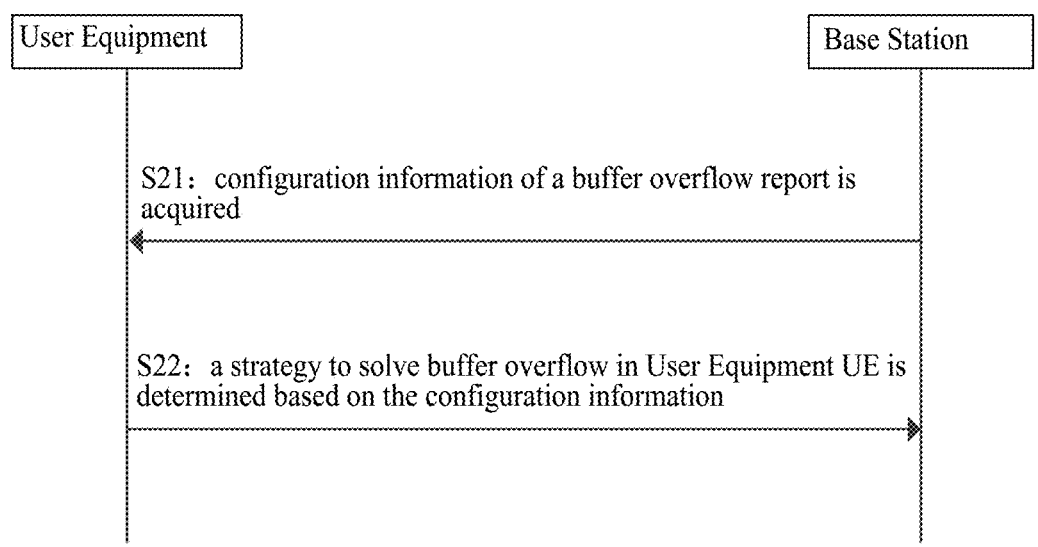
FIG. 2 is a flowchart of a method for transmission processing according to an example.

As illustrated in FIG. 2, a present embodiment provides description of a method for transmission processing, and the method includes S21 and S22.

In step S21: configuration information of a buffer overflow report is acquired;

in step S22: a strategy to solve buffer overflow in User Equipment UE is determined based on the configuration information.

The method for transmission processing described in the embodiment of the present disclosure is applied to the user equipment. Here, the user equipment may be a mobile phone, a computer, a server, a transceiver, a tablet apparatus, a medical apparatus or a wearable apparatus.

In an embodiment, the step S21 includes: receiving the configuration information of the buffer overflow report sent by a base station. In another embodiment, the step S21 includes: the UE determining the configuration information of the buffer overflow report.

Of course, in other embodiments, the configuration information may also be acquired from other network device of a network system, which is not limited herein.

Here, the base station may be an access device for user equipment to access a mobile network. The base station may be of various types, such as a 3G base station, a 4G base station or a 5G base station.

In an embodiment, the step S22 may be: reporting the reporting information of the buffer overflow in the UE based on the configuration information.

Thus, in the present embodiment, the reporting information may be reported based on the configuration information, so as to reduce confusion in reception and management of base station information caused by UE randomly sending the reporting information of the buffer overflow. Moreover, phenomenon of poor wireless environment caused by UE random reporting is reduced.

In the embodiment of the present disclosure, the buffer overflow refers to that: the buffer configuration of the UE does not match a transmission rate of the UE, such that a part of a data packet in the data packets to be buffered that are received by the UE overflows, or a read/write rate of the UE does not match the transmission rate of the UE, such that a part of a data packet in the data packets to be buffered that are received by the UE overflows.

Here, the configuration information includes:
permission configuration, used to indicate that the UE is allowed to report the configuration information of the buffer overflow problem, or that the UE is not allowed to report the configuration information of the buffer overflow problem.

In some embodiments, the configuration information is also used to indicate, but is not limited to, one or more of the following: a minimum remaining buffer capacity, a maximum used buffer capacity, a maximum read/write rate, and a reporting time interval.

Here, the reporting information includes: reporting information of the buffer overflow problem, or reporting information that the buffer overflow problem is solved.

For example, in some embodiments, the step S22 includes:
in response to the buffer overflow problem existing in the UE, sending the reporting information indicating the buffer overflow problem based on the configuration information; or,
in response to that the buffer overflow problem in the UE is solved, sending the reporting information indicating that the buffer overflow problem is solved based on the configuration information.

Thus, in the embodiment of the present disclosure, corresponding reporting information may be reported based on whether there is the buffer overflow problem in the UE or whether the buffer overflow problem is solved. This allows the base station to know that the buffer overflow exists or has occurred in the UE, which facilitates subsequent adjustment of the configuration information for the UE by the base station based on the reporting information, so as to solve the buffer overflow problem in the UE.

In an embodiment, the sending the reporting information indicating the buffer overflow in the UE includes sending the reporting information indicating the buffer overflow in the UE based on a radio control resource (RRC) signaling.

For example, in an application scenario, the UE may send the reporting information indicating the buffer overflow in the UE through terminal auxiliary information (UE Assistance Information).

Thus, in the present embodiment, an existing terminal auxiliary information signaling may be used to carry the reporting information for reporting, so as to achieve the reuse of signaling and improves the compatibility of signaling.

In the embodiments of the present disclosure, the configuration information of the buffer overflow report may be received through the UE, and the strategy to solve the buffer overflow in the user equipment UE may be determined based on the configuration information. In this way, according to the embodiments of the present disclosure, the strategy to solve the buffer overflow in the UE may be determined based on the configuration information, which is beneficial to timely solve the buffer overflow problem in the UE, and also reduce the confusion in reception and management of the base station caused by UE randomly sending the reporting information of the buffer overflow or sending the reporting information of the buffer overflow once the buffer overflow problem exists. Moreover, phenomenon of poor wireless environment caused by UE random reporting is reduced.

Moreover, in the embodiment of the disclosure, the configuration information may include the configuration information that allows the UE to report the buffer overflow problem. In this way, the user equipment allows to report the buffer overflow problem based on the configuration information. Alternatively, the configuration information may include the configuration information that does not allow the UE to report buffer overflow problem. In this way, the user equipment is not allowed to report the buffer overflow problem based on the configuration information.

Figure 3:
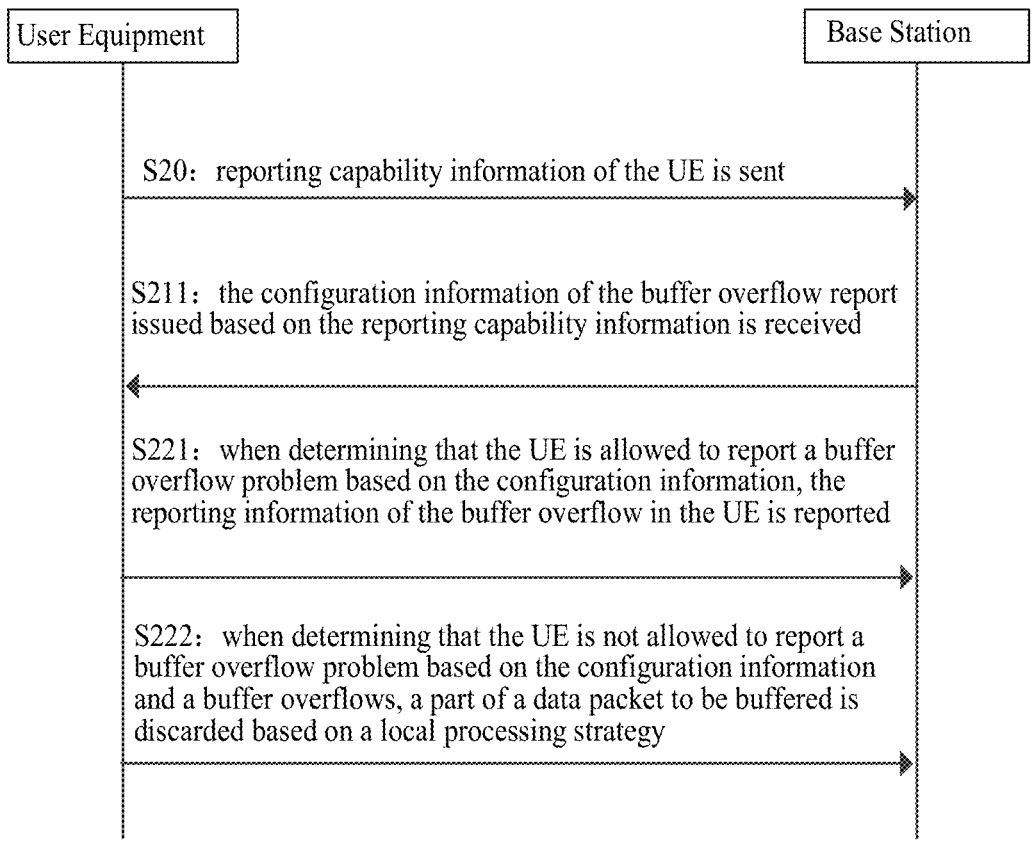
FIG. 3 is a flowchart of a method for transmission processing according to an example.

As illustrated in FIG. 3, in some embodiments, the method further includes S20.

In step S20: reporting capability information of the UE is sent.

The step S21 includes S211.

In step S211: the configuration information of the buffer overflow report issued based on the reporting capability information is received.

In the embodiment of the present disclosure, the reporting capability information includes: reporting capability information that has the reporting of the buffer overflow problem, or reporting capability information that does not have the reporting of the buffer overflow problem.

For example, in an application scenario, the UE determines that the UE has reporting capability to support the reporting of the buffer overflow problem, and the UE sends the reporting capability information that has the reporting of the buffer overflow problem to the base station based on the equipment configuration of the UE itself.

For example, the equipment configuration includes but is not limited to one or more of the following: a buffer capacity, a read/write rate, a supported bandwidth and CPU power consumption.

For another example, in another application scenario, the UE determines that the UE doesn't have the reporting capability to support the reporting of the buffer overflow problem, and the UE sends the reporting capability information that does not have the reporting of the buffer overflow problem to the base station based on equipment configuration of the UE itself.

In an embodiment, the step S20 includes: sending the reporting capability information of the UE through user equipment-new radio-capability (UE-NR-Capability) signaling. In this way, in the present embodiment, the reporting capability information of the UE in 5G network may be reported.

In another embodiment, the step S20 includes: sending the reporting capability information of the UE through user equipment-evolved wireless access network-capability (UE-EUTRA-Capability) signaling. In this way, in the present embodiment, the reporting capability information of the UE in 3G network may be reported.

Of course, in other embodiments, the reporting information may also be reported based on other signaling, such as wireless resource control signaling. In other embodiments, the reporting capability information of the UE in 4G or other network systems may also be reported, which is not limited herein.

In the embodiment of the present disclosure, corresponding signalings in different types of network systems may be used to send the reporting information in different network systems, respectively, so as to improve the accuracy and efficiency of the reporting information.

In the embodiment of the present disclosure, the UE sends the reporting capability information of the UE and receive the configuration information of the buffer overflow report issued by the base station based on the reporting capability information. For example, when the reporting capability information is the reporting capability information that does not have the reporting of the buffer overflow problem, the received configuration information is the configuration information that does not allow the UE to report the buffer overflow problem. In this way, according to the embodiment of the present disclosure, it is possible to configure the configuration information that does not allow the UE to report the buffer overflow problem for some UEs that do not have the reporting capability.

For another example, when the reporting capability information is the configuration information that has the reporting of the buffer overflow problem, the received configuration information may be the configuration information that allows the UE to report the buffer overflow problem. In this way, according to the embodiment of the present disclosure, it is possible to configure the configuration information that allows the UE to report the buffer overflow problem for some UEs that have the reporting capability.

For yet another example, when the reporting capability information is the configuration information that has the reporting of the buffer overflow problem, the received configuration information may also be the configuration information that does not allow the UE to report the buffer overflow problem. In this way, according to the embodiment of the present disclosure, even if the UE has the reporting capability, if the base station does not allow the UE to report the configuration information of the buffer overflow problem, the UE may still be configured with the configuration information that does not allow the UE to report the buffer overflow problem.

In this way, in the embodiment of the present disclosure, the base station may configure the UE with appropriate configuration information based on whether the UE has the reporting capability to report the buffer overflow problem, so as to further reduce the waste of system resources.

Referring to FIG. 3 again, in some embodiments, step S22 includes S221.

In step S221: when determining that the UE is allowed to report a buffer overflow problem based on the configuration information, the reporting information of the buffer overflow in the UE is reported.

In some embodiments, information of the reporting information includes one or more of the following:
  a current wireless configuration;
  a desired wireless configuration;
  a current buffer configuration;
  a desired buffer configuration.

In an embodiment, the current wireless configuration and/or the desired wireless configuration include a transmission rate. Here, the transmission rate is a rate of transmission data between the UE and the base station.

In an embodiment, the current buffer configuration and/or the desired buffer configuration include: a buffer capacity and/or a read/write rate.

In the embodiment of the present disclosure, the UE may send the current wireless configuration to the base station, such that the base station may configure a transmission rate that may solve the buffer overflow problem for the UE based on the current wireless configuration. Alternatively, the UE may send the desired wireless configuration to the base station, such that the base station may configure a transmission rate that may solve the buffer overflow problem for the UE based on the wireless configuration recommended by the UE.

Alternatively, the UE may also send the current buffer configuration, such as the buffer capacity and/or the read/write rate and the like, to the base station, such that the base station may configure a transmission rate that may solve the buffer overflow problem for the UE based on the current buffer capacity and/or the current read/write rate. Alternatively, the UE may send a desired buffer configuration, such as a buffer capacity and/or a read/write rate, to the base station, such that the base station may configure a transmission rate that may solve the buffer overflow problem for the UE based on the buffer capacity and/or the read/write rate recommended by the UE.

In some embodiments, the step S221 includes:
  when determining that the UE is allowed to report the buffer overflow problem based on the configuration information and when the buffer overflow problem satisfying a reporting condition occurs, reporting the reporting information of the buffer overflow in the UE.

In some embodiments, the satisfying reporting condition includes one or more of the following:
  a current remaining buffer capacity of the UE being less than or equal to a minimum remaining buffer capacity in the configuration information;
  a current used buffer capacity of the UE being greater than or equal to a maximum used buffer capacity in the configuration information;
  a current read/write rate of the UE being greater than or equal to a maximum read/write rate in the configuration information;
  a time difference between a current time and a time at which the reporting information is last reported being greater than or equal to a reporting time interval in the configuration information.

In the embodiment of the disclosure, the UE only reports the reporting information of the buffer overflow in the UE when determining that the overflow problem satisfies the reporting condition.

For example, when the current remaining buffer capacity of the UE is less than or equal to the minimum remaining buffer capacity in the configuration information, or the current used buffer capacity of the UE is greater than or equal to the maximum used buffer capacity of the configuration information, or the current read/write rate of the UE is greater than or equal to the maximum read/write rate in the configuration information, the reporting information of the buffer overflow in the UE is reported. In this way, the reporting information of the buffer overflow may be reported only after the UE meets the reporting condition of the buffer overflow problem, which facilitates that the base station determines the configuration information to solve the buffer overflow problem based on the reporting information.

For another example, when the time difference between the current time and the time at which the reporting information is last reported is greater than or equal to a reporting time interval in the configuration information, the reporting information of the buffer overflow in the UE may be reported. In this way, it may reduce the repeated reporting of the buffer overflow in the UE due to a short reporting time interval, and reduce the repeated reporting of unnecessary reporting information.

Referring to FIG. 3 again, in some embodiments, step S22 further includes S222.

In step S222: when determining that the UE is not allowed to report a buffer overflow problem based on the configuration information and a buffer overflows, a part of a data packet to be buffered is discarded based on a local processing strategy.

Here, an implement to discard a part of the data packet to be buffered according to the local processing strategy is as follows:

discarding a data packet to be buffered with a lowest priority based on a priority of the packets to be buffered.

Here, another implement to discard a part of the data packet to be buffered according to the local processing strategy is as follows:

discarding a data packet to be buffered whose receiving time is beyond a predetermined time threshold range based on the receiving time of the data packet to be buffered.

Here, yet another implement to discard a part of the data packet to be buffered according to the local processing strategy is as follows:

discarding a data packet to be buffered in a predetermined type based on a service type of the data packet to be buffered.

For example, for a data packet to be buffered for Ultra-Reliable and Low Latency Communications (URLLC) service and a data packet to be buffered for Enhanced Mobile Broad Band (EMBB) service, the data packet to be buffered for the EMBB service is discarded first.

In the embodiment of the present disclosure, if the UE determines that the base station does not allow the UE to report the buffer overflow problem based on the configuration information, and when the buffer overflows, the UE may rely on the local processing strategy of the UE to discard a part of the data packet to be buffered, so as to solve the buffer overflow problem of the UE.

Figure 4:
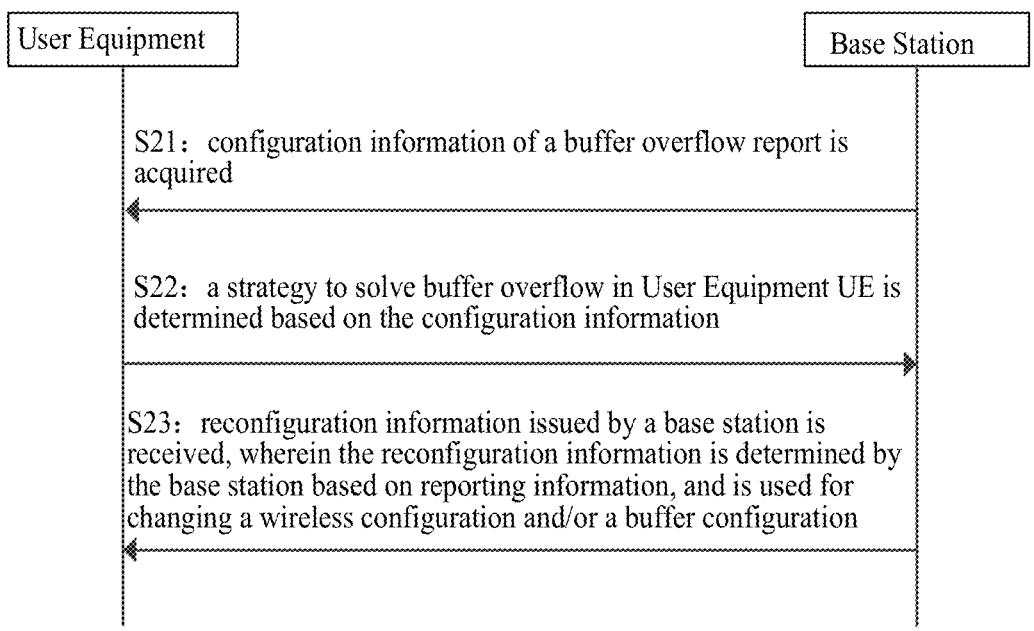
FIG. 4 is a flowchart of a method for transmission processing according to an example.

As illustrated in FIG. 4, in some embodiments, the method further includes S23.

In step S23: reconfiguration information issued by a base station is received, wherein the reconfiguration information is determined by the base station based on reporting information, and is used for changing a wireless configuration and/or a buffer configuration.

Here, the reconfiguration information includes a wireless configuration and/or a buffer configuration re-provided by the base station. The re-provided reconfiguration information may be re-determined based on a previously reporting information, or may be re-provided based on a current load and/or wireless environment of the base station.

In an application scenario, the wireless configuration after the UE is changed is less than or equal to the maximum wireless configuration that the UE may provide. Alternatively, the buffer configuration after the UE is changed is less than or equal to the maximum buffer configuration that the UE may provide.

In another application scenario, the wireless configuration after the UE is changed is less than or equal to the desired maximum wireless configuration of the UE. Alternatively, the buffer configuration after the UE is changed is less than or equal to the desired maximum buffer configuration reported by the UE.

In this way, in the present embodiment, the changed wireless configuration and/or the changed buffer configuration may greatly reduce a probability that the buffer overflow problem occurs in the UE, which may reduce the number of data retransmissions, save system resources, and improve the quality of business.

In an embodiment, the wireless configuration is: a transmission rate.

In an embodiment, the buffer configuration includes: a buffer capacity and/or a read/write rate.

In some embodiments, the method further includes:

A transmission configuration of the UE is updated based on the reconfiguration information.

In an embodiment, the transmission configuration of the UE is updated based on the reconfiguration information, including:

the transmission rate of the UE being updated based on the reconfiguration information.

For example, in an application scenario, if the UE determines that the current remaining buffer capacity of the UE is less than or equal to the minimum remaining buffer capacity in the configuration information based on the configuration information, the UE reports the reporting information of the current remaining buffer capacity. The UE receives the reconfiguration information that requires reducing the transmission rate of the UE and updates the transmission rate of the UE based on the reconfiguration information, wherein the reconfiguration information is determined by the base station based on the reporting information of the current remaining buffer capacity.

For another example, in an application scenario, if the UE determines that the current read/write rate of the UE is greater than or equal to the maximum read/write rate in the configuration information based on the configuration information, the UE reports the reporting information of the current read/write rate. The UE receives the reconfiguration information that requires reducing the transmission rate of the UE and updates the transmission rate of the UE based on the reconfiguration information, wherein the reconfiguration information is determined by the base station based on the reporting information of the current read/write rate.

Of course, in other application scenarios, if the UE reports the reporting information when determining that the current used buffer capacity of the UE is greater than or equal to the maximum used buffer capacity in the configuration information, the UE may also receive the reconfiguration information that requires reducing the transmission rate of the UE and update the transmission rate of the UE based on the reconfiguration information, wherein the reconfiguration information is determined by the base station based on the reporting information.

In this way, in the embodiment of the present disclosure, the reconfiguration information that is determined by the base station based on the reporting information may be received, and the transmission configuration of the UE may be updated based on the reconfiguration information, so as to solve the buffer overflow problem of the UE. In this way, the embodiments of the present disclosure may reduce the occurrence of the data packet loss caused by the buffer overflow problem in the UE, which may reduce the number of data retransmissions, save system resources, and improve the quality of business.

Of course, in other application scenarios, the UE may also receive the reconfiguration information for updating the buffer configuration, and the reconfiguration information is determined by the base station based on the above reporting information. For example, the reconfiguration information that increases the buffer capacity and/or the read/write rate of the UE is received. In this way, in the embodiment of the present disclosure, the buffer capacity of the UE itself may also be expanded and/or the read/write rate of the UE itself may be improved to solve the buffer overflow problem of the UE.

In some embodiments, the receiving the reconfiguration information issued by the base station includes:

receiving the reconfiguration information, issued by the base station, based on the reporting information within a predetermined time range after sending the reporting information.

Here, the predetermined time range may be several seconds, tens of seconds or several minutes, and the like.

In the embodiment of the present disclosure, only when the reconfiguration information is not received within the predetermined time range after sending the reporting information, a data packet loss processing may be carried out in time based on the local processing strategy to reduce loss of important data packet caused by automatic overflow.

In other embodiments, the method further includes:
when the reconfiguration information issued based on the reporting information is not received within the predetermined time range after sending the reporting information and a buffer overflows, discarding a part of a data packet to be buffered based on a local processing strategy;
or,
when a refusal instruction issued based on the reporting information is received within the predetermined time range after sending the reporting information and a buffer overflows, discarding a part of a data packet to be buffered based on a local processing strategy.

In an embodiment, receiving the refusal instruction issued based on the reporting information includes:
receiving a RRC signaling carrying the refusal instruction.

Here, an implement to discard a part of the data packet to be buffered according to the local processing strategy is as follows:
discarding a data packet to be buffered with a lowest priority based on a priority of the packets to be buffered.

Here, another implement to discard a part of the data packet to be buffered according to the local processing strategy is as follows:
discarding a data packet to be buffered whose receiving time is beyond a predetermined time threshold range based on the receiving time of the data packet to be buffered.

Here, yet another implement to discard a part of the data packet to be buffered according to the local processing strategy is as follows:
discarding a data packet to be buffered in a predetermined type based on a service type of the data packet to be buffered.

In the embodiment of the present disclosure, if the base station does not configure the reconfiguration information for the UE or directly issues the refusal instruction to reject configuring the reconfiguration information to the UE, the UE may also solve the buffer overflow problem of the UE through its own processing strategy, such as the data packet loss. In this way, the embodiment of the present disclosure may solve the buffer overflow problem of the UE to a certain extent and reduce frequent repeated data sending through the processing strategy of the UE itself, thereby saving system resources and improving the quality of service.

It should be pointed out here that the following description of a method for transmission processing is applied to the base station and is similar to the description of the method for transmission processing applied to the user equipment. For the technical details not disclosed in the embodiments of the method for transmission processing applied to the base station in the present disclosure, please refer to the description of the embodiments of the method for transmission processing applied to the user equipment in the present disclosure, which will not be described in detail here.

Figure 5:
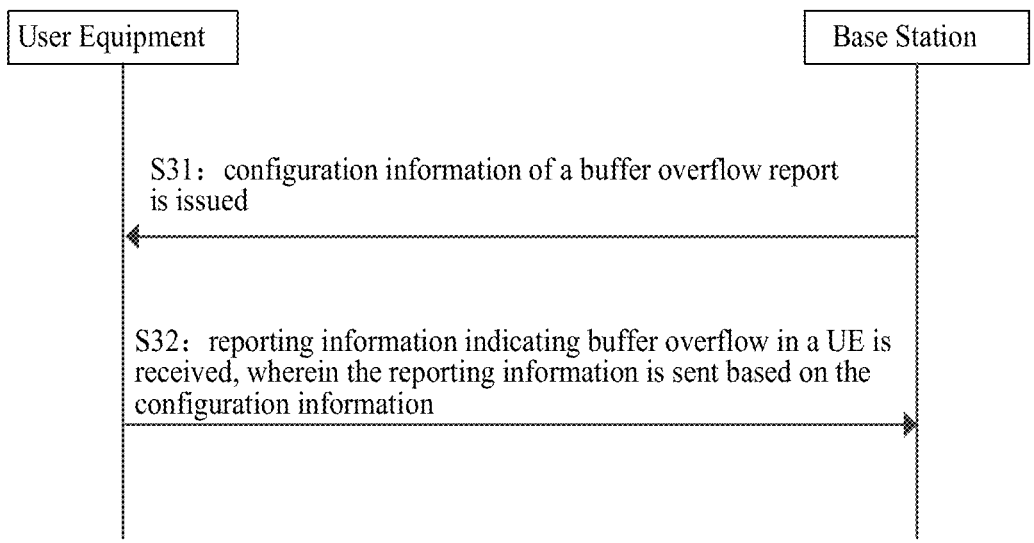
FIG. 5 is a flowchart of a method for transmission processing according to an example.

As illustrated in FIG. 5, embodiments of the present disclosure disclose a method for transmission processing, and the method includes S31 and S32.

In step S31: configuration information of a buffer overflow report is issued;

In step S32: reporting information indicating buffer overflow in a UE is received, wherein the reporting information is sent based on the configuration information.

The method for transmission processing in the embodiment of the present disclosure is applied to the base station. Here, the base station may be an access device for user equipment to access a mobile network. The base station may be of various types, such as a 3G base station, a 4G base station or a 5G base station.

In an embodiment, the step S31 includes:
issuing the configuration information of the buffer overflow report to the UE.

The step S32 includes:
receiving the reporting information indicating the buffer overflow in the UE, wherein the reporting information is sent by the UE based on the configuration information.

In some embodiments, the method further includes:
receiving reporting capability information of the UE;
determining the configuration information of the buffer overflow report based on the reporting capability information.

In some embodiments, the step S32 includes:
receiving the reporting information of the buffer overflow in the UE, wherein the reporting information is reported by the UE when determining that the UE is allowed to report a buffer overflow problem based on the configuration information.

In some embodiments, the step S32 includes:
receiving the reporting information of the buffer overflow in the UE, wherein the reporting information is reported by the UE when determining that the UE is allowed to report the buffer overflow problem based on configuration information and the buffer overflow problem satisfying a reporting condition occurs.

In some embodiments, the satisfying the reporting condition includes one or more of the following:
a current remaining buffer capacity of the UE being less than or equal to a minimum remaining buffer capacity in the configuration information;
a current used buffer capacity of the UE being greater than or equal to a maximum used buffer capacity in the configuration information;
a current read/write rate of the UE being greater than or equal to a maximum read/write rate in the configuration information;
a time difference between a current time and a time at which the reporting information is last reported being greater than or equal to a reporting time interval in the configuration information.

In some embodiments, information of the reporting information includes one or more of the following:
a current wireless configuration;
a desired wireless configuration;
a current buffer configuration;
a desired buffer configuration.

In some embodiments, the method further includes:
determining reconfiguration information based on the reporting information; wherein the reconfiguration information is used for changing a wireless configuration and/or a buffer configuration;
sending the reconfiguration information to the UE.

In some embodiments, the sending the reconfiguration information to the UE includes:
sending the reconfiguration information to the UE within a predetermined time range after receiving the reporting information.

In some embodiments, the method further includes:
determining a refusal instruction based on the reporting information; wherein the refusal instruction is used for triggering the UE to discard a part of a data packet to be buffered based on a local processing strategy when a buffer overflows;
sending the refusal instruction to the UE.

In some embodiments, the step S32 includes:
receiving the reporting information indicating the buffer overflow problem based on the configuration information, wherein the reporting information is sent by the UE in response to a buffer overflow problem in the UE;
or,
receiving the reporting information indicating that buffer overflow problem is solved based on the configuration information, wherein the reporting information is sent by the UE in response to that a buffer overflow problem in the UE is solved.

Figure 6:
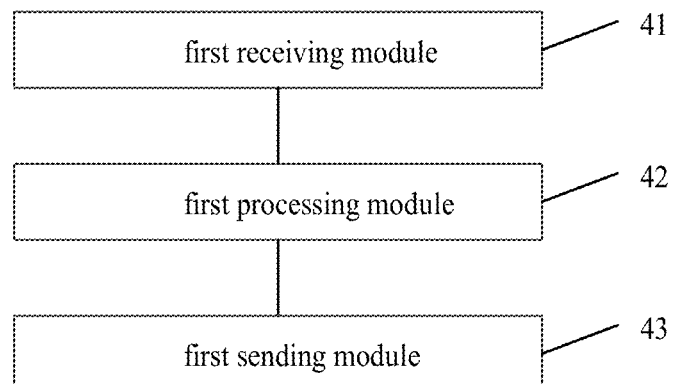
FIG. 6 is a block diagram of an apparatus for transmission processing according to an example.

As illustrated in FIG. 6, the embodiments of the present disclosure provide an apparatus for transmission processing, and the apparatus includes:
a first receiving module 41, configured to acquire configuration information of a buffer overflow report;
a first processing module 42, configured to determine a strategy to solve buffer overflow in User Equipment UE based on the configuration information.

Here, the apparatus for transmission processing is applied to user equipment UE.

In some embodiments, the apparatus further includes:
a first sending module 43, configured to send reporting capability information of the UE;
the first receiving module 41 is configured to receive the configuration information of the buffer overflow report issued based on the reporting capability information.

In some embodiments, the first sending module 43 is configured to report reporting information of the buffer overflow in the UE, when determining that the UE is allowed to report a buffer overflow problem based on the configuration information.

In some embodiments, the first sending module 43 is configured to report the reporting information of the buffer overflow in the UE, when determining that the UE is allowed to report the buffer overflow problem based on configuration information and when the buffer overflow problem satisfying a reporting condition occurs.

In some embodiments, the satisfying the reporting condition includes one or more of the following:
a current remaining buffer capacity of the UE being less than or equal to a minimum remaining buffer capacity in the configuration information;
a current used buffer capacity of the UE being greater than or equal to a maximum used buffer capacity in the configuration information;
a current read/write rate of the UE being greater than or equal to a maximum read/write rate in the configuration information;
a time difference between a current time and a time at which the reporting information is last reported being greater than or equal to a reporting time interval in the configuration information.

In some embodiments, information of reporting information includes one or
a current wireless configuration;
a desired wireless configuration;
a current buffer configuration;
a desired buffer configuration.

In some embodiments, the first receiving module 41 is configured to receive reconfiguration information issued by a base station, wherein the reconfiguration information is used for changing a wireless configuration and/or a buffer configuration.

In some embodiments, the first receiving module 41 is configured to receive the reconfiguration information, issued by the base station, based on the reporting information within a predetermined time range after sending the reporting information.

In some embodiments, the apparatus further includes:
a first processing module 42, wherein the first processing module 42 is configured to, when the reconfiguration information issued based on the reporting information is not received within the predetermined time range after sending the reporting information and a buffer overflows, discard a part of a data packet to be buffered based on a local processing strategy;
or
when a refusal instruction issued based on the reporting information is received within the predetermined time range after sending the reporting information and a buffer overflows, discard a part of a data packet to be buffered based on a local processing strategy.

In some embodiments, the first processing module 42 is configured to, when determining that the UE is not allowed to report a buffer overflow problem based on the configuration information and a buffer overflows, discard a part of a data packet to be buffered based on a local processing strategy.

In some embodiments, the first sending module 43 is configured to send a reporting information indicating the buffer overflow problem based on the configuration information in response to the buffer overflow problem existing in the UE;
or,
send a reporting information indicating that the buffer overflow problem is solved based on the configuration information in response to that the buffer overflow problem in the UE is solved.

Figure 7:
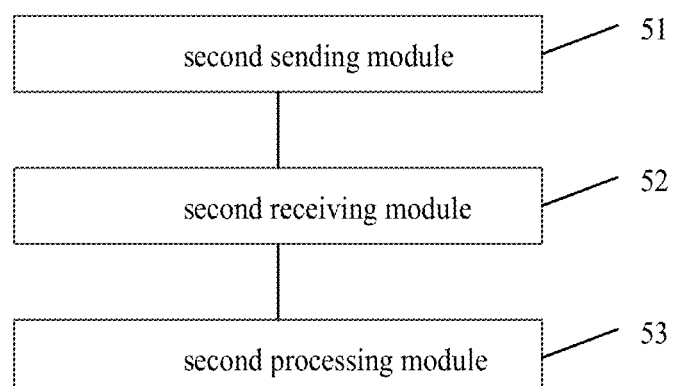
FIG. 7 is a block diagram of an apparatus for transmission processing according to an example.

As illustrated in FIG. 7, the embodiments of the present disclosure provide an apparatus for transmission processing applied to a base station, and the apparatus includes:
a second sending module 51 configured to issue configuration information of a buffer overflow report;
a second receiving module 52 configured to receive reporting information indicating buffer overflow in a UE, wherein the reporting information is sent based on the configuration information.

Here, the apparatus for transmission processing is applied to the base station.

In some embodiments, the second receiving module 52 is configured to receive reporting capability information of the UE;

the apparatus further includes:
a second processing module 53, configured to determine the configuration information of the buffer overflow report, based on the reporting capability information.

In some embodiments, the second receiving module 52 is configured to receive the reporting information of the buffer overflow in the UE, wherein the reporting information is reported by the UE when determining that the UE is allowed to report a buffer overflow problem based on the configuration information.

In some embodiments, the second receiving module 52 is configured to receive the reporting information of the buffer overflow in the UE, wherein the reporting information is reported by the UE when determining that the UE is allowed to report a buffer overflow problem based on the configuration information and the buffer overflow problem satisfying a reporting condition occurs.

In some embodiments, the satisfying the reporting condition includes one or more of the following:
a current remaining buffer capacity of the UE being less than or equal to a minimum remaining buffer capacity in the configuration information;
a current used buffer capacity of the UE being greater than or equal to a maximum used buffer capacity in the configuration information;
a current read/write rate of the UE being greater than or equal to a maximum read/write rate in the configuration information;
a time difference between a current time and a time at which the reporting information is last reported being greater than or equal to a reporting time interval in the configuration information.

In some embodiments, information of the reporting information includes one or
a current wireless configuration;
a desired wireless configuration;
a current buffer configuration;
a desired buffer configuration.

In some embodiments, the second processing module 53 is configured to determine reconfiguration information based on the reporting information; wherein the reconfiguration information is used for changing a wireless configuration and/or a buffer configuration;
the second sending module 51 is configured to send the reconfiguration information to the UE.

In some embodiments, the second sending module 51 is configured to send the reconfiguration information to the UE within a predetermined time range after receiving the reporting information.

In some embodiments, the second processing module 53 is configured to determine a refusal instruction based on the reporting information; wherein the refusal instruction is used for triggering the UE to discard a part of a data packet to be buffered based on a local processing strategy when a buffer overflows;
the second sending module 52 is configured to send the refusal instruction to the UE.

In some embodiments, the second receiving module 52 is configured to receive the reporting information indicating the buffer overflow problem based on the configuration information, wherein the reporting information is sent by the UE in response to a buffer overflow problem in the UE;
or,
receive the reporting information indicating that buffer overflow problem is solved based on the configuration information, wherein the reporting information is sent by the UE in response to that a buffer overflow problem in the UE is solved.

As for the apparatus in the foregoing embodiments, specific manners of modules performing operations have been described in details with reference to the embodiments related to the corresponding methods, which is not particularly explained here.

Embodiments of the present disclosure provide a communication device, and the communication device includes:
a processor;
a memory for storing executable instructions by the processor;
wherein the processor is configured to implement the method for transmission processing described in any embodiment of the present disclosure when executing the executable instructions.

Here, the communication device includes a base station or user equipment.

The memory may include various types of storage media, and the storage media is a non-transitory computer storage medium that is able to continue to store the information stored thereon after the communication device is powered off. Here, the communication device includes a base station or user equipment.

The processor may be connected to the memory through a bus or the like, and is configured to read executable programs stored on the memory, for example, through at least one of the method illustrated in FIGS. 2 to 5.

Embodiments of the present disclosure provide a computer storage medium, the computer storage medium stores a computer executable program, and when the computer executable program is executed by a processor, the method for transmission processing described in any embodiment of the present disclosure is implemented, for example, through at least one of the method illustrated in FIGS. 2 to 5.

As for the apparatus in the foregoing embodiments, specific manners of modules performing operations have been described in details with reference to the embodiments related to the corresponding methods, which is not particularly explained here.

Figure 8:
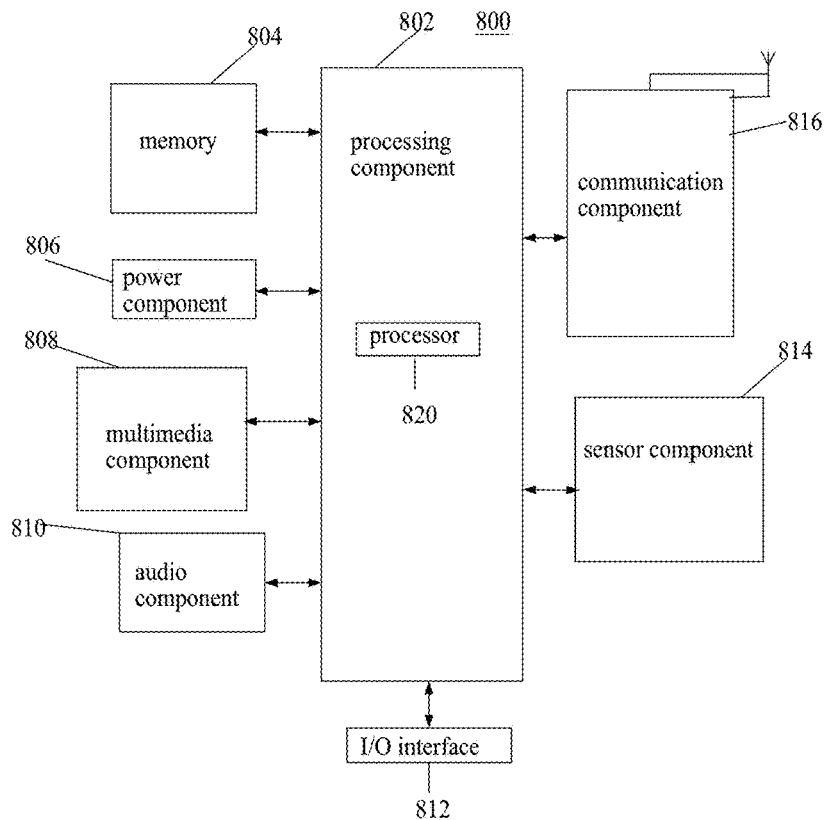
FIG. 8 is a block diagram of user equipment according to an example.

FIG. 8 is a block diagram of a user equipment (UE) 800 for transmission processing according to an example. For example, the user equipment 800 may be a mobile phone, a computer, digital broadcast device, messaging device, a gaming console, tablet device, medical device, exercise device, a personal digital assistant, and the like.

Referring to FIG. 8, the user equipment 800 may include at least one of a processing component 802, memory 804, a power component 806, a multimedia component 808, an audio component 810, an input/output (I/O) interface 812, a sensor component 814, a communication component 816, and the like.

The processing component 802 may generally control an overall operation of the user equipment 800, such as operations associated with display, a telephone call, data communication, a camera operation, a recording operation, etc. The processing component 802 may include one or more processors 820 to execute instructions so as to complete all or a part of steps of the aforementioned method. In addition, the processing component 802 may include one or more modules to facilitate interaction between the processing component 802 and other components. For example, the processing component 802 may include a multimedia portion to facilitate interaction between the multimedia component 808 and the processing component 802.

The memory 804 may be configured to store various types of data to support the operation of the user equipment 800. Examples of such data include instructions for any applications or methods operated on the user equipment 800, contact data, phonebook data, messages, pictures, video, etc. The memory 804 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 806 provides power to various components of the user equipment 800. The power component 806 may include a power management system, one or more power sources, and any other components associated with the generation, management, and distribution of power for the user equipment 800.

The multimedia component 808 may include a display screen providing an output interface between the user equipment 800 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 808 includes a front camera and/or a rear camera. The front camera and the rear camera may receive an external multimedia data while the user equipment 800 is in an operation mode, such as a photographing mode or a video mode. Each of the front camera and the rear camera may be a fixed optical lens system or have optical focusing and zooming capability.

The audio component 810 may be configured to output and/or input audio signals. For example, the audio component 810 may include a microphone ("MIC") configured to receive an external audio signal when the user equipment 800 is in an operation mode, such as a call mode, a recording mode, and a voice recognition mode. The received audio signal may be further stored in the memory 804 or transmitted via the communication component 816. In some embodiments, the audio component 810 further includes a speaker to output audio signals.

The I/O interface 812 provides an interface between the processing component 802 and peripheral interface modules, the peripheral interface modules being, for example, a keyboard, a click wheel, buttons, and the like. The buttons may include, but are not limited to, a home button, a volume button, a starting button, and a locking button.

The sensor component 814 includes one or more sensors to provide status assessments of various aspects of the user equipment 800. For instance, the sensor component 814 may detect an open/closed status of the user equipment 800, relative positioning of components (e.g., the display and the keypad, of the user equipment 800), a change in position of the user equipment 800 or a component of the user equipment 800, a presence or absence of user contact with the user equipment 800, an orientation or an acceleration/deceleration of the user equipment 800, and a change in temperature of the user equipment 800. The sensor component 814 may include a proximity sensor configured to detect the presence of a nearby object without any physical contact. The sensor component 814 may also include a light sensor, such as a CMOS or CCD image sensor, for use in imaging applications. In some embodiments, the sensor component 814 may also include an accelerometer sensor, a gyroscope sensor, a magnetic sensor, a pressure sensor, or a temperature sensor or thermometer.

The communication component 816 may be configured to facilitate communication, wired or wirelessly, between the user equipment 800 and other devices. The user equipment 800 can access a wireless network based on a communication standard, such as WiFi, 2G, 3G, LTE, or 4G cellular technologies, or a combination thereof. In an example, the communication component 816 receives a broadcast signal or broadcast associated information from an external broadcast management system via a broadcast channel. In an example, the communication component 816 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In some examples, the user equipment 800 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In some examples, there is also provided a non-transitory computer-readable storage medium including instructions, such as included in the memory 804, executable by the processor 820 in the user equipment 800, for performing the above-described methods. For example, the non-transitory computer-readable storage medium may be a Read-Only Memory (ROM), Random Access Memory (RAM), Compact Disc Read-Only Memory (CD-ROM), a magnetic tape, a floppy disk, optical data storage device, and the like.

Figure 9:
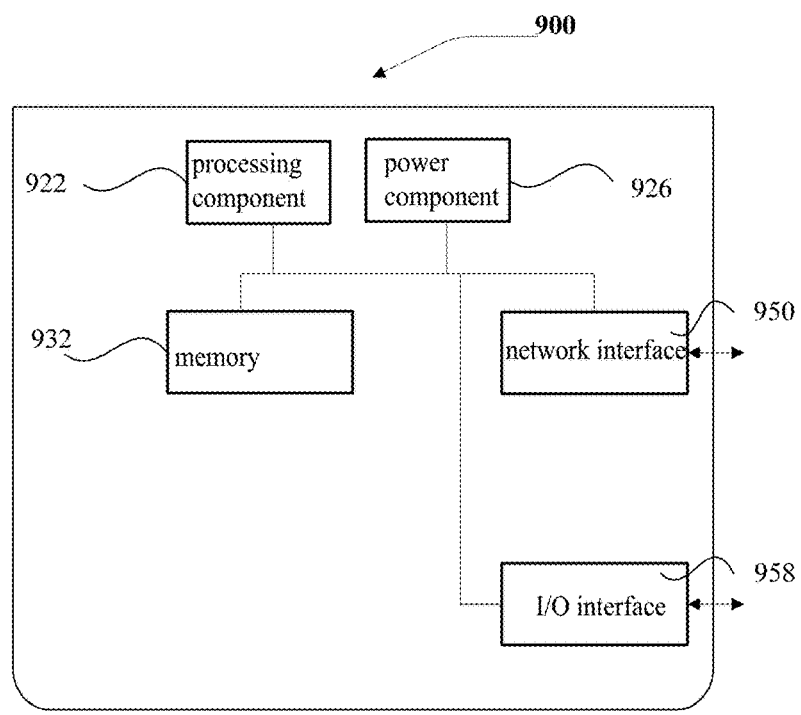
FIG. 9 is a block diagram of a base station according to an example.

As illustrated in FIG. 9, a structure of a base station is shown according to embodiments of the disclosure. For example, the base station 900 may be provided as a network side device. As illustrated in FIG. 9, the base station 900 includes a processing component 922. The processing component 922 further includes one or more processors, and a memory resource represented by a memory 932, for storing instructions that can be executed by the processing component 922, such as application programs. The application programs stored in the memory 932 may include one or more modules each corresponding to a set of instructions. In addition, the processing component 922 is configured to execute any of the aforementioned methods applied to the base station as described above, such as the method illustrated in FIG. 2 to FIG. 5.

The base station 900 may also include a power component 926 configured to perform power management of the base station 900, a wired or wireless network interface 950 configured to connect the base station 900 to a network, and an input/output (I/O) interface 958. The base station 900 may operate based on an operating system stored in the memory 932, such as Windows Server™, Mac OS X™, Unix™, Linux™, FreeBSD™ or the like.

Other embodiments of the present disclosure will readily occur to those skilled in the art upon consideration of the specification and practice of embodiments disclosed herein. The present disclosure is intended to cover any variations, uses, or adaptations of the disclosure that follow the general principles of the present disclosure and include common general knowledge or techniques in the technical field not disclosed by the disclosure. The specification and examples are to be regarded as exemplary only, with the true scope and spirit of the disclosure being indicated by the appended claims.

It should be understood that the present disclosure is not limited to the precise structures described above and illustrated in the accompanying drawings, and that various modifications and changes may be made without departing from the scope thereof. The scope of the present disclosure is limited only by the appended claims.

Embodiments of the present disclosure disclose a method and an apparatus for information processing, user equipment, a base station and a storage medium.

According to an aspect of the present disclosure, a method for transmission processing is provided and includes:
  acquiring configuration information of a buffer overflow report; and
  determining a strategy to solve buffer overflow in UE based on the configuration information.

In some embodiments, the method further includes:
sending reporting capability information of the UE;
where the acquiring the configuration information of the buffer overflow report includes:
  receiving the configuration information of the buffer overflow report issued based on the reporting capability information.

In some embodiments, the determining the strategy to solve the buffer overflow in the UE based on the configuration information includes:
  when determining that the UE is allowed to report a buffer overflow problem based on the configuration information, reporting the reporting information of the buffer overflow in the UE.

In some embodiments, when determining that the UE is allowed to report the buffer overflow problem based on the configuration information, the reporting the reporting information of the buffer overflow in the UE includes:
  when determining that the UE is allowed to report the buffer overflow problem based on the configuration information and when the buffer overflow problem satisfying a reporting condition occurs, reporting the reporting information of the buffer overflow in the UE.

In some embodiments, the satisfying reporting condition includes one or more of the following:
  a current remaining buffer capacity of the UE being less than or equal to a minimum remaining buffer capacity in the configuration information;
  a current used buffer capacity of the UE being greater than or equal to a maximum used buffer capacity in the configuration information;
  a current read/write rate of the UE being greater than or equal to a maximum read/write rate in the configuration information; or
  a time difference between a current time and a time at which the reporting information is last reported being greater than or equal to a reporting time interval in the configuration information.

In some embodiments, information of reporting information includes one or more of the following:
  a current wireless configuration;
  a desired wireless configuration;
  a current buffer configuration; or
  a desired buffer configuration.

In some embodiments, the method further includes:
receiving reconfiguration information issued by a base station, wherein the reconfiguration information is determined by the base station based on reporting information, and is used for changing a wireless configuration and/or a buffer configuration.

In some embodiments, the receiving the reconfiguration information issued by the base station includes:
  receiving the reconfiguration information, issued by the base station, based on the reporting information within a predetermined time range after sending the reporting information.

In some embodiments, the method further includes:
when the reconfiguration information issued based on the reporting information is not received within the predetermined time range after sending the reporting information and a buffer overflows, discarding a part of a data packet to be buffered based on a local processing strategy;
or,
when a refusal instruction issued based on the reporting information is received within the predetermined time range after sending the reporting information and a buffer overflows, discarding a part of a data packet to be buffered based on a local processing strategy.

In some embodiments, the determining the strategy to solve the buffer overflow in the User Equipment UE based on the configuration information includes:
  when determining that the UE is not allowed to report a buffer overflow problem based on the configuration information and a buffer overflows, discarding a part of a data packet to be buffered based on a local processing strategy.

In some embodiments, the reporting the reporting information of the buffer overflow in the UE includes:
  in response to the buffer overflow problem existing in the UE, sending the reporting information indicating the buffer overflow problem based on the configuration information;
  or,
  in response to that the buffer overflow problem in the UE is solved, sending the reporting information indicating that the buffer overflow problem is solved based on the configuration information.

According another aspect of the present disclosure, a method for transmission processing includes:
  issuing configuration information of a buffer overflow report; and
  receiving reporting information indicating buffer overflow in a UE, where the reporting information is sent based on the configuration information.

In some embodiments, the method further includes:
receiving reporting capability information of the UE; and
determining the configuration information of the buffer overflow report based on the reporting capability information.

In some embodiments, receiving the reporting information indicating the buffer overflow in the UE, wherein the reporting information is sent based on the configuration information includes:
  receiving the reporting information of the buffer overflow in the UE, wherein the reporting information is reported by the UE when determining that the UE is allowed to report a buffer overflow problem based on the configuration information.

In some embodiments, the receiving the reporting information indicating the buffer overflow in the UE, wherein the reporting information is sent by the UE when determining that the UE is allowed to report the buffer overflow problem based on the configuration information, includes:

receiving the reporting information of the buffer overflow in the UE, wherein the reporting information is reported by the UE when determining that the UE is allowed to report the buffer overflow problem based on configuration information and the buffer overflow problem satisfying a reporting condition occurs.

In some embodiments, the satisfying the reporting condition includes one or a current remaining buffer capacity of the UE being less than or equal to a minimum remaining buffer capacity in the configuration information;

a current used buffer capacity of the UE being greater than or equal to a maximum used buffer capacity in the configuration information;

a current read/write rate of the UE being greater than or equal to a maximum read/write rate in the configuration information; or a time difference between a current time and a time at which the reporting information is last reported being greater than or equal to a reporting time interval in the configuration information.

In some embodiments, information of the reporting information includes one or more of the following:

a current wireless configuration;
a desired wireless configuration;
a current buffer configuration; or
a desired buffer configuration.

In some embodiments, the method further includes:

determining reconfiguration information based on the reporting information; wherein the reconfiguration information is used for changing a wireless configuration and/or a buffer configuration; and sending the reconfiguration information to the UE.

In some embodiments, sending the reconfiguration information to the UE includes:

sending the reconfiguration information to the UE within a predetermined time range after receiving the reporting information.

In some embodiments, the method further includes:

determining a refusal instruction based on the reporting information; wherein the refusal instruction is used for triggering the UE to discard a part of a data packet to be buffered based on a local processing strategy when a buffer overflows; and sending the refusal instruction to the UE.

In some embodiments, the receiving the reporting information indicating the buffer overflow in the UE, wherein the reporting information is sent based on the configuration information includes:

receiving the reporting information indicating the buffer overflow problem based on the configuration information, wherein the reporting information is sent by the UE in response to a buffer overflow problem in the UE; or, receiving the reporting information indicating that buffer overflow problem is solved based on the configuration information, wherein the reporting information is sent by the UE in response to that a buffer overflow problem in the UE is solved.

According to yet another aspect of the present disclosure, an apparatus for transmission processing is provided and applied to the UE, and the apparatus includes:

a first receiving module, configured to acquire configuration information of a buffer overflow report; and a first processing module, configured to determine a strategy to solve buffer overflow in User Equipment UE based on the configuration information.

In some embodiments, the apparatus further includes:

a first sending module configured to send reporting capability information of the UE;

where the first receiving module is configured to receive the configuration information of the buffer overflow report issued based on the reporting capability information.

In some embodiments, the first sending module is configured to report reporting information of the buffer overflow in the UE, when determining that the UE is allowed to report a buffer overflow problem based on the configuration information.

In some embodiments, the first sending module is configured to report the reporting information of the buffer overflow in the UE, when determining that the UE is allowed to report the buffer overflow problem based on configuration information and when the buffer overflow problem satisfying a reporting condition occurs.

In some embodiments, the satisfying the reporting condition includes one or more of the following:

a current remaining buffer capacity of the UE being less than or equal to a minimum remaining buffer capacity in the configuration information;

a current used buffer capacity of the UE being greater than or equal to a maximum used buffer capacity in the configuration information;

a current read/write rate of the UE being greater than or equal to a maximum read/write rate in the configuration information; or a time difference between a current time and a time at which the reporting information is last reported being greater than or equal to a reporting time interval in the configuration information.

In some embodiments, information of reporting information includes one or more of the following:

a current wireless configuration;
a desired wireless configuration;
a current buffer configuration; or
a desired buffer configuration.

In some embodiments, the first receiving module is configured to receive reconfiguration information issued by a base station, where the reconfiguration information is determined by the base station based on reporting information, and is used for changing a wireless configuration and/or a buffer configuration.

In some embodiments, the first receiving module is configured to receive the reconfiguration information, issued by the base station, based on the reporting information within a predetermined time range after sending the reporting information.

In some embodiments, the apparatus further includes:

a first processing module, where the first processing module is configured to, when the reconfiguration information issued based on the reporting information is not received within the predetermined time range after sending the reporting information and a buffer overflows, discard a part of a data packet to be buffered based on a local processing strategy;

or when a refusal instruction issued based on the reporting information is received within the predetermined time range after sending the reporting information and a buffer overflows, discard a part of a data packet to be buffered based on a local processing strategy.

In some embodiments, the first processing module is configured to, when determining that the UE is not allowed to report a buffer overflow problem based on the configuration information and a buffer overflows, discard a part of a data packet to be buffered based on a local processing strategy.

In some embodiments, the first sending module is configured to send a reporting information indicating the buffer overflow problem based on the configuration information in response to the buffer overflow problem existing in the UE; or, send a reporting information indicating that the buffer overflow problem is solved based on the configuration information in response to that the buffer overflow problem in the UE is solved.

According to yet another aspect of the present disclosure, an apparatus for transmission processing is provided and includes:

a second sending module configured to issue configuration information of a buffer overflow report;

a second receiving module configured to receive reporting information indicating buffer overflow in a UE, wherein the reporting information is sent based on the configuration information.

In some embodiments, the second receiving module is configured to receive reporting capability information of the UE;

the apparatus further includes:

a second processing module, configured to determine the configuration information of the buffer overflow report, based on the reporting capability information.

In some embodiments, the second receiving module is configured to receive the reporting information of the buffer overflow in the UE, wherein the reporting information is reported by the UE when determining that the UE is allowed to report a buffer overflow problem based on the configuration information.

In some embodiments, the second receiving module is configured to receive the reporting information of the buffer overflow in the UE, wherein the reporting information is reported by the UE when determining that the UE is allowed to report a buffer overflow problem based on the configuration information and the buffer overflow problem satisfying a reporting condition occurs.

In some embodiments, the satisfying the reporting condition includes one or more of the following:

a current remaining buffer capacity of the UE being less than or equal to a minimum remaining buffer capacity in the configuration information;

a current used buffer capacity of the UE being greater than or equal to a maximum used buffer capacity in the configuration information;

a current read/write rate of the UE being greater than or equal to a maximum read/write rate in the configuration information; or a time difference between a current time and a time at which the reporting information is last reported being greater than or equal to a reporting time interval in the configuration information.

In some embodiments, information of the reporting information includes one or more of the following:

a current wireless configuration;
a desired wireless configuration;
a current buffer configuration; or
a desired buffer configuration.

In some embodiments, the second processing module is configured to determine reconfiguration information based on the reporting information; wherein the reconfiguration information is used for changing a wireless configuration and/or a buffer configuration;

the second sending module is configured to send the reconfiguration information to the UE.

In some embodiments, the second sending module is configured to send the reconfiguration information to the UE within a predetermined time range after receiving the reporting information.

In some embodiments, the second processing module is configured to determine a refusal instruction based on the reporting information; wherein the refusal instruction is used for triggering the UE to discard a part of a data packet to be buffered based on a local processing strategy when a buffer overflows;

the second sending module is configured to send the refusal instruction to the UE.

In some embodiments, the second receiving module is configured to receive the reporting information indicating the buffer overflow problem based on the configuration information, wherein the reporting information is sent by the UE in response to a buffer overflow problem in the UE; or, receive the reporting information indicating that buffer overflow problem is solved based on the configuration information, wherein the reporting information is sent by the UE in response to that a buffer overflow problem in the UE is solved.

According to yet another aspect of the present disclosure, a communication device is provided and includes a processor;

a memory for storing executable instructions by the processor;

wherein the processor is configured to implement the method for transmission processing according to any embodiment of the present disclosure when executing the executable instructions.

According to yet another aspect of the embodiments of the present disclosure, a computer storage medium is provided, wherein the computer storage medium stores a computer executable program, and when the computer executable program is executed by a processor, the method for transmission processing according to any embodiment of the present disclosure is implemented.

The technical solution provided by the embodiments of the present disclosure may include the following beneficial effects:

In the embodiments of the present disclosure, the configuration information of the buffer overflow report may be acquired, and the strategy to solve the buffer overflow in the user equipment UE may be determined based on the configuration information. In this way, according to the embodiments of the present disclosure, the strategy to solve the buffer overflow in the UE may be determined based on the configuration information, which is beneficial to timely solve the buffer overflow problem in the UE, and also reduce the confusion in reception and management of the base station caused by UE randomly sending the reporting information of the buffer overflow or sending the reporting information of the buffer overflow once the buffer overflow problem exists. Moreover, phenomenon of poor wireless environment caused by UE random reporting is reduced.

What is claimed is:

1. A method for transmission processing, comprising:
acquiring configuration information of a buffer overflow report; and determining a strategy to solve buffer overflow in a User Equipment (UE) based on the configuration information;

wherein determining the strategy to solve the buffer overflow in the UE based on the configuration information comprises:

in response to determining that the UE is allowed to report a buffer overflow problem based on the configuration information, reporting a reporting information of the buffer overflow in the UE; and in response to determining that the UE is not allowed to report a buffer overflow problem based on the configuration information and a buffer overflows, discarding a part of a data packet to be buffered based on a local processing strategy.

2. The method according to claim 1, further comprising:
sending reporting capability information of the UE;
wherein acquiring the configuration information of the buffer overflow report comprises:
receiving the configuration information based on the reporting capability information.

3. The method according to claim 1, wherein in response to determining that the UE is allowed to report the buffer overflow problem based on the configuration information, reporting the reporting information comprises:

in response to determining that the UE is allowed to report the buffer overflow problem based on the configuration information and the buffer overflow problem satisfies a reporting condition, reporting the reporting information.

4. The method according to claim 3, wherein the reporting condition comprises one or more of following conditions:
a current remaining buffer capacity of the UE being less than or equal to a minimum remaining buffer capacity in the configuration information;
a current used buffer capacity of the UE being greater than or equal to a maximum used buffer capacity in the configuration information;
a current read and write rate of the UE being greater than or equal to a maximum read and write rate in the configuration information; or
a time difference between a current time and a time at which the reporting information is last reported being greater than or equal to a reporting time interval in the configuration information.

5. The method according to claim 1, wherein the reporting information comprises one or more of following configurations:
a current wireless configuration;
a desired wireless configuration;
a current buffer configuration; or
a desired buffer configuration.

6. The method according to claim 1, further comprising:
receiving reconfiguration information issued by a base station, wherein the reconfiguration information is determined by the base station based on the reporting information, and is used for changing at least one of a wireless configuration and a buffer configuration.

7. The method according to claim 6, wherein receiving the reconfiguration information issued by the base station comprises:
receiving the reconfiguration information within a predetermined time range after sending the reporting information.

8. The method according to claim 7, further comprising:
in response to determining that the reconfiguration information is not received within the predetermined time range after sending the reporting information and a buffer overflows, discarding a part of a data packet to be buffered based on a local processing strategy;

or, in response to determining that a refusal instruction issued based on the reporting information is received within the predetermined time range after sending the reporting information and a buffer overflows, discarding a part of a data packet to be buffered based on a local processing strategy.

9. The method according to claim 1, wherein reporting the reporting information comprises:
in response to determining that the buffer overflow problem exists in the UE, sending the reporting information indicating the buffer overflow problem based on the configuration information;

or, in response to determining that the buffer overflow problem in the UE is solved, sending the reporting information indicating that the buffer overflow problem is solved based on the configuration information.

10. A method for transmission processing, comprising:
issuing configuration information of a buffer overflow report; and
receiving reporting information indicating buffer overflow in a User Equipment (UE), wherein the reporting information is sent based on the configuration information;

wherein receiving the reporting information indicating the buffer overflow in the UE comprises:
receiving the reporting information of the buffer overflow in the UE, wherein the reporting information is reported by the UE in response to determining that the UE is allowed to report a buffer overflow problem based on the configuration information;

wherein the method further comprises:
determining a refusal instruction based on the reporting information; wherein the refusal instruction is used for triggering the UE to discard a part of a data packet to be buffered based on a local processing strategy in response to determining that a buffer overflows; and
sending the refusal instruction to the UE.

11. The method according to claim 10, further comprising:
receiving reporting capability information of the UE; and
determining the configuration information based on the reporting capability information.

12. The method according to claim 10, wherein receiving the reporting information indicating the buffer overflow in the UE, wherein the reporting information is reported by the UE in response to determining that the UE is allowed to report the buffer overflow problem based on the configuration information, comprises:
receiving the reporting information wherein the reporting information is reported by the UE in response to determining that the UE is allowed to report the buffer overflow problem based on configuration information and the buffer overflow problem satisfies a reporting condition.

13. The method according to claim 12, wherein the reporting condition comprises one or more of following conditions:
a current remaining buffer capacity of the UE being less than or equal to a minimum remaining buffer capacity in the configuration information;

a current used buffer capacity of the UE being greater than or equal to a maximum used buffer capacity in the configuration information;

a current read and write rate of the UE being greater than or equal to a maximum read and write rate in the configuration information; or a time difference between a current time and a time at which the reporting information is last reported being greater than or equal to a reporting time interval in the configuration information.

14. The method according to claim 10, wherein the reporting information comprises one or more of following configurations:

a current wireless configuration;
a desired wireless configuration;
a current buffer configuration; or
a desired buffer configuration.

15. The method according to claim 10, further comprising:

determining reconfiguration information based on the reporting information; wherein the reconfiguration information is used for changing at least one of a wireless configuration and a buffer configuration; and sending the reconfiguration information to the UE within a predetermined time range after receiving the reporting information.

16. A communication device, comprising:

a processor;

a memory for storing executable instructions by the processor;

wherein the processor is configured to, when executing the executable instructions, implement operations comprising:

acquiring configuration information of a buffer overflow report; and determining a strategy to solve buffer overflow in a User Equipment (UE) based on the configuration information;

wherein the operation of determining the strategy to solve the buffer overflow in the UE based on the configuration information comprises:

in response to determining that the UE is allowed to report a buffer overflow problem based on the configuration information, reporting a reporting information of the buffer overflow in the UE; and in response to determining that the UE is not allowed to report a buffer overflow problem based on the configuration information and a buffer overflows, discarding a part of a data packet to be buffered based on a local processing strategy.

* * * * *